(12) United States Patent
Ferrari

(10) Patent No.: US 7,624,510 B2
(45) Date of Patent: Dec. 1, 2009

(54) JOINT AXIS FOR COORDINATE MEASUREMENT MACHINE

(75) Inventor: Paul Ferrari, Carlsbad, CA (US)

(73) Assignee: Hexagon Metrology, Inc., Norcross, GA (US)

( * ) Notice: Subject to any disclaimer, the term of this patent is extended or adjusted under 35 U.S.C. 154(b) by 130 days.

(21) Appl. No.: 11/963,531

(22) Filed: Dec. 21, 2007

(65) Prior Publication Data

US 2009/0013548 A1 Jan. 15, 2009

Related U.S. Application Data

(60) Provisional application No. 60/871,729, filed on Dec. 22, 2006.

(51) Int. Cl.
*G01B 5/008* (2006.01)
(52) U.S. Cl. .......................................... 33/503; 33/557
(58) Field of Classification Search .................. 33/503, 33/504, 556, 557, 559, 560; 356/614; 702/150, 702/152
See application file for complete search history.

(56) References Cited

U.S. PATENT DOCUMENTS

| 5,084,981 A | 2/1992 | McMurtry et al. |
| 5,088,337 A | 2/1992 | Bennett |
| 5,148,377 A | 9/1992 | McDonald |
| 5,187,874 A | 2/1993 | Takahashi et al. |
| 5,189,797 A | 3/1993 | Granger |
| 5,396,712 A | 3/1995 | Herzog |
| 5,408,754 A | 4/1995 | Raab |
| 5,412,880 A | 5/1995 | Raab |
| 5,505,003 A | 4/1996 | Evans et al. |
| 5,510,977 A | 4/1996 | Raab |
| 5,521,847 A | 5/1996 | Ostrowski et al. |
| 5,528,505 A | 6/1996 | Granger et al. |
| 5,611,147 A | 3/1997 | Raab |
| 5,615,489 A | 4/1997 | Breyer et al. |

(Continued)

FOREIGN PATENT DOCUMENTS

DE 4345091 A1 7/1995

(Continued)

OTHER PUBLICATIONS

International Search Report and Written Opinion for PCT/US2007088735 mailed Mar. 31, 2008.

*Primary Examiner*—R. A. Smith
(74) *Attorney, Agent, or Firm*—Knobbe, Martens, Olson & Bear LLP

(57) ABSTRACT

One aspect of the present invention comprises a coordinate measurement apparatus that includes an articulated arm having a first end, a second end, and plurality of jointed arm segments therebetween, each arm segment including at least one position transducer. A measurement probe assembly is coupled to the second end of the arm. The measurement probe assembly comprises a first joint providing a first axis of rotation between the second end of the arm and a body of the measurement probe assembly. An encoder includes an encoder housing and an encoder shaft. The encoder housing is configured to rotate about a second axis with respect to the encoder shaft, which is rigidly coupled to the body. A probe is rigidly coupled to the encoder shaft. A measurement device is coupled to the encoder housing such that the measurement device rotates about a second axis with respect to the probe.

24 Claims, 4 Drawing Sheets

U.S. PATENT DOCUMENTS

| | | |
|---|---|---|
| 5,757,499 A | 5/1998 | Eaton |
| 5,768,792 A | 6/1998 | Raab |
| 5,822,450 A | 10/1998 | Arakawa et al. |
| 5,829,148 A | 11/1998 | Eaton |
| 5,978,748 A | 11/1999 | Raab |
| 5,991,704 A | 11/1999 | Rekar et al. |
| 6,134,506 A | 10/2000 | Rosenberg et al. |
| 6,151,789 A * | 11/2000 | Raab et al. ............ 33/503 |
| 6,154,972 A * | 12/2000 | Otsubo ............ 33/503 |
| 6,161,079 A | 12/2000 | Zink et al. |
| 6,163,973 A * | 12/2000 | Matsumiya et al. ............ 33/559 |
| 6,219,928 B1 | 4/2001 | Raab et al. |
| 6,366,831 B1 | 4/2002 | Raab |
| 6,598,306 B2 | 7/2003 | Eaton |
| 6,611,346 B2 | 8/2003 | Granger |
| 6,611,617 B1 | 8/2003 | Crampton |
| 6,618,496 B1 | 9/2003 | Tassakos et al. |
| 6,640,458 B2 * | 11/2003 | Sawdon ............ 33/502 |
| 6,668,466 B1 | 12/2003 | Bieg et al. |
| 6,817,108 B2 | 11/2004 | Eaton |
| 6,822,749 B1 * | 11/2004 | Christoph ............ 356/609 |
| 6,892,465 B2 | 5/2005 | Raab et al. |
| 6,904,691 B2 | 6/2005 | Raab et al. |
| 6,925,722 B2 | 8/2005 | Raab et al. |
| 6,931,745 B2 | 8/2005 | Granger |
| 6,952,882 B2 | 10/2005 | Raab et al. |
| 6,984,236 B2 | 1/2006 | Raab |
| 6,988,322 B2 | 1/2006 | Raab et al. |
| 7,003,892 B2 | 2/2006 | Eaton et al. |
| 7,017,275 B2 | 3/2006 | Raab et al. |
| 7,043,847 B2 | 5/2006 | Raab et al. |
| 7,051,450 B2 | 5/2006 | Raab et al. |
| 7,073,271 B2 | 7/2006 | Raab et al. |
| 7,152,456 B2 | 12/2006 | Eaton |
| 7,174,651 B2 | 2/2007 | Raab et al. |
| 7,246,030 B2 | 7/2007 | Raab et al. |
| 7,269,910 B2 | 9/2007 | Raab et al. |
| 7,296,979 B2 | 11/2007 | Raab et al. |
| 7,372,581 B2 | 5/2008 | Raab et al. |
| 7,395,606 B2 | 7/2008 | Crampton |
| 2007/0063500 A1 | 3/2007 | Eaton |

FOREIGN PATENT DOCUMENTS

| | | |
|---|---|---|
| DE | 101 12 977 | 11/2002 |
| EP | 0522610 A1 | 6/1992 |
| FR | 2740546 | 1/1998 |
| GB | 2274526 A | 7/1994 |

* cited by examiner

JOINT AXIS FOR COORDINATE MEASUREMENT MACHINE

CROSS REFERENCE TO RELATED APPLICATION

This application claims the benefit of U.S. Provisional Patent Application No. 60/871,729, entitled "JOINT AXIS FOR COORDINATED MEASUREMENT MACHINE", filed Dec. 22, 2006, pending.

Also, this application hereby incorporates by reference the above-identified application, in its entirety.

BACKGROUND

1. Field of the Invention

The present invention relates to measuring devices, and more particularly, to articulated arm coordinate measurement machines for measuring the coordinates of three-dimensional objects.

2. Description of the Related Art

Rectilinear measuring systems, also referred to as coordinate measuring machines (CMM's) and articulated arm measuring machines including portable coordinate measuring machines (PCMM's) have been described for generating geometry information from various objects and areas. In general, these instruments capture the structural characteristics of an object for use in electronic rendering and duplication. One example of a conventional apparatus used for coordinate data acquisition comprises a support and a moveable measuring arm made up of hinged segments to which a contact-sensitive probe or remote scanning device is attached.

Geometry information or three-dimensional coordinate data characterizing the shape, features, and size of the object may be acquired by tracing or scanning along the object's surface and contours. Probe or scanning device movement is typically tracked relative to a reference coordinate system resulting in a collection of data points and information that may be used to develop an accurate electronic rendering of the object. In conventional implementations, the acquired geometry information is processed by a computer capable of making use of the information to model the surface contours and dimensions of the object.

SUMMARY

One aspect of the present invention comprises a coordinate measurement device that includes an articulated arm having a first end, a second end, and a plurality of jointed arm segments therebetween, each arm segment including at least one position transducer. A measurement probe assembly is coupled to the second end of the arm. The measurement probe assembly comprises a first joint providing a first axis of rotation between the second end of the arm and a body of the measurement probe assembly. A read head and an encoder disk are provided. The encoder disk is configured to rotate about a second axis with respect to the encoder read head. A first probe is rotatably fixed with respect to the body about the second axis of rotation. A second prove is coupled to the body such that the measurement device rotates about a second axis with respect to the first probe.

Another aspect of the present invention is a coordinate measurement apparatus that includes an articulated arm having a first end, a second end, and plurality of jointed arm segments therebetween, each arm segment including at least one position transducer. The measurement probe assembly is coupled to the second end of the arm. The measurement probe assembly includes a first joint providing a first axis of rotation between the second end of the arm and a body of the measurement probe assembly. A probe is rigidly coupled to the first joint. A measurement device is configured for rotation about the probe.

Another aspect of the present invention comprises a portable coordinate measurement machine (CMM) for measuring the position of an object in a selected volume. The CMM can include a manually positionable articulated arm having opposed first and second ends, said arm including a plurality of rotary joints. A measurement assembly can be coupled to the second end of the arm. The measurement assembly comprises a first rotable joint providing a first axis of rotation and a probe rigidly coupled to the first joint. The measurement device is configured for rotation about the probe. The machine also includes means for rotating the measurement device about the probe along a second axis of rotation.

Another aspect is a joint for a coordinate measurement apparatus. The joint comprises a joint body, a rotatable joint, a first probe connector, and a second probe connector. The joint body is connectable to a coordinate measurement apparatus. The rotatable joint defines an axis of rotation of the joint. The first probe connector is rotationally fixed with respect to the joint body about the axis of rotation of the joint. The second probe connector is rotatable with respect to the joint body about the axis of rotation of the joint.

BRIEF DESCRIPTION OF THE DRAWINGS

Further objects, features and advantages of the invention will become apparent from the following detailed description taken in conjunction with the accompanying figures showing illustrative embodiments of the invention, in which.

DETAILED DESCRIPTION OF THE PREFERRED EMBODIMENTS

Figure 1:
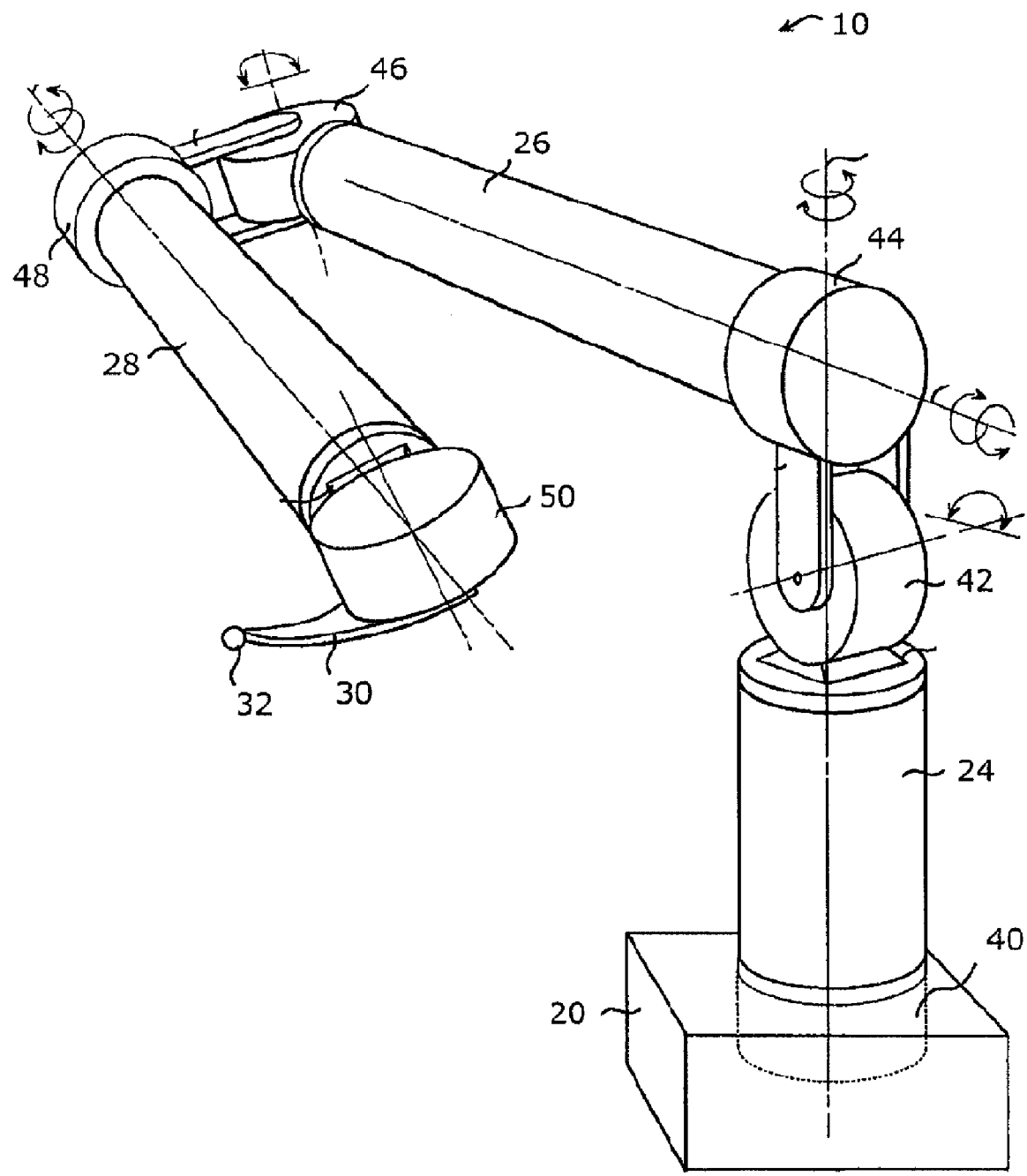
FIG. 1 is a perspective view of an embodiment of coordinate measuring machine.

FIG. 1 illustrates one embodiment coordinate measuring machine (CMM) 10. In the illustrated embodiment, the CMM 10 comprises a base 20, a plurality of rigid transfer members 24, 26, 28, a coordinate acquisition member 30 and a plurality of articulation members 40, 42, 44, 46, 48, 50 connecting the rigid transfer members 24, 26, 28 to one another. Each articulation member is configured to impart one or more rotational and/or angular degrees of freedom. Through the various articulation members 40, 42, 44, 46, 48, 50, the CMM 10 can be aligned in various spatial orientations thereby allowing fine positioning of the coordinate acquisition member 110 in three dimensional space.

The position of the rigid transfer members 24, 26, 28 and the coordinate acquisition member 30 may be adjusted using manual, robotic, semi-robotic and/or any other adjustment method. In one embodiment, the CMM 10, through the various articulation members, is provided with seven rotary axes of movement. It will be appreciated, however, that there is no strict limitation to the number of axes of movement that may be used, and fewer or additional axes of movement may be incorporated into the CMM design.

In various embodiments, the coordinate acquisition member 30 comprises a contact sensitive member or probe 32 configured to engage the surfaces of a selected object and generate coordinate data on the basis of probe contact. Alternatively, the coordinate acquisition member 30 may comprise a remote scanning and detection component that does not necessarily require direct contact with the selected object to acquire geometry data. In one embodiment, a laser coordinate detection device (e.g., laser camera) may be used to obtain geometry data without direct object contact. It will be appreciated that various coordinate acquisition member configurations including: a contact-sensitive probe, a remote-scanning probe, a laser-scanning probe, a probe that uses a strain gauge for contact detection, a probe that uses a pressure sensor for contact detection, a probe that used an infrared beam for positioning, and a probe configured to be electrostatically-responsive may be used for the purposes of coordinate acquisition.

In certain embodiments, one or more of the rigid transfer members 24, 26, 28 comprise a composite structure that includes an inner portion and an outer exoskeletal portion. In such an arrangement, the inner portions of the rigid transfer members 24, 26, 28 are interconnected to one another through articulation members 42, 44, 46, 48 that provide the ability to position the coordinate acquisition member 30 in a variety of different orientations in three dimensional space. The rigid transfer members 24, 26, 28 can likewise be coupled to the base 20 and the coordinate acquisition member 30 by articulation members 40, 50. The outer portions surrounding the various inner portions of the rigid transfer members 24, 26, 28 form an environmental barrier that at least partially encloses segments of the inner portions. In one aspect, the inner portions are configured to "float" inside the corresponding outer portions.

As is known in the art, the position of the probe 32 in space at a given instant can be calculated by knowing the length of each member and the specific position of each of the articulation members 40, 42, 44, 46, 48, 50. Each of the articulation members 40, 42, 44, 46, 48, 50 can be broken down into a singular rotational degree of motion, each of which is measured using a dedicated rotational transducer (e.g., an encoder or digital encoder). Each transducer outputs a signal, which varies according to the movement of the articulation members 40, 42, 44, 46, 48, 50 in its degree of motion. The signal can be carried through wires or otherwise transmitted to a the base 20.

In one embodiment, the transducer can comprise an optical, or digital encoder. In general, each encoder measures the rotational position of its axle by coupling is movement to a pair of internal wheels having successive transparent and opaque bands. In such embodiments, light can be shined through the wheels onto optical sensors which feed a pair of electrical outputs. As the axle sweeps through an arc, the output of the analog encoder can be substantially two sinusoidal signals which are 90 degrees out of phase. Coarse positioning can occur through monitoring the change in polarity of the two signals. Fine positioning can be determined by measuring the actual value of the two signals at the instant in question. In certain embodiments, maximum accuracy can be obtained by measuring the output precisely before it is corrupted by electronic noise. Additional details and embodiments of the illustrated embodiment of the CMM 10 can be found in U.S. Pat. No. 5,829,148, the entirety of which is hereby. As described in the '148 patent, one or more of the joints are preferably configured for infinite rotation.

In certain embodiments, one or more of the rigid transfer members 24, 26, 28 can be in the form of a dual concentric tubular structure having an inner tubular shaft rotatively mounted coaxially within an outer tubular sheath through one or more bearings mounted proximately to a first end of a member adjacent to a hinge joint (e.g., 42, 46) and one or more bearings located at an opposite end of the member. The use of cylindrical tubes for both sheath and shaft is preferred because they offer construction simplicity, rigidity, light weight, and space inside for the transducers, slip rings etc. The tubes are preferably made from a light-weight, rigid material such as epoxy bonded carbon graphite which inexpensively offers a strength to weight ratio in excess of that of steel. Another advantage of carbon graphite is that it has a low thermal expansion coefficient. Although temperature transducers are commonly used in coordinate measuring machines so as to compensate for the thermal expansion of the arm and the article being measured, errors in compensation are reduced in arms having a lower overall thermal expansion coefficient.

Figure 2A:
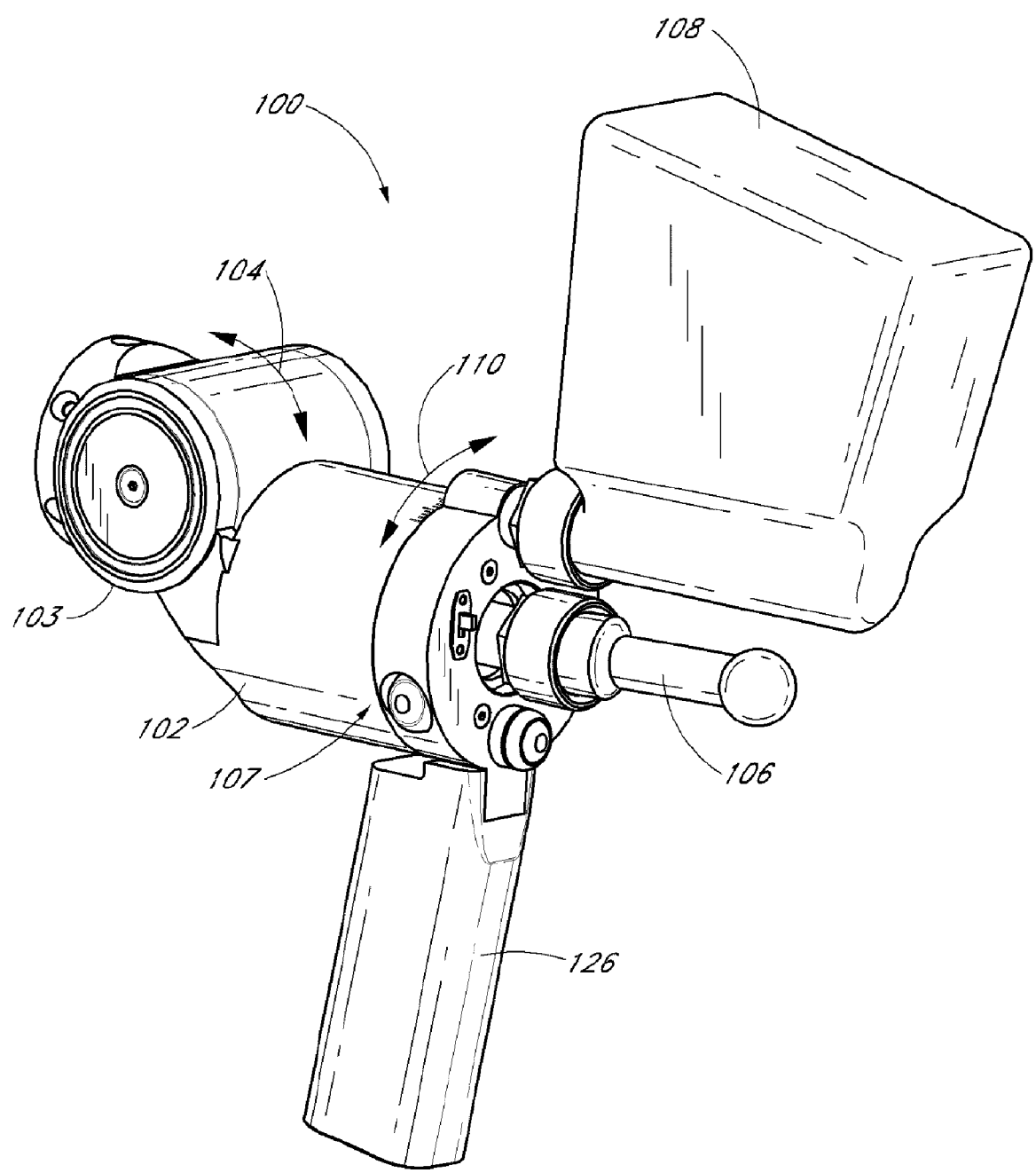
FIG. 2A is a perspective view of an embodiment of an end joint assembly for a coordinate measuring machine.
Figure 2B:
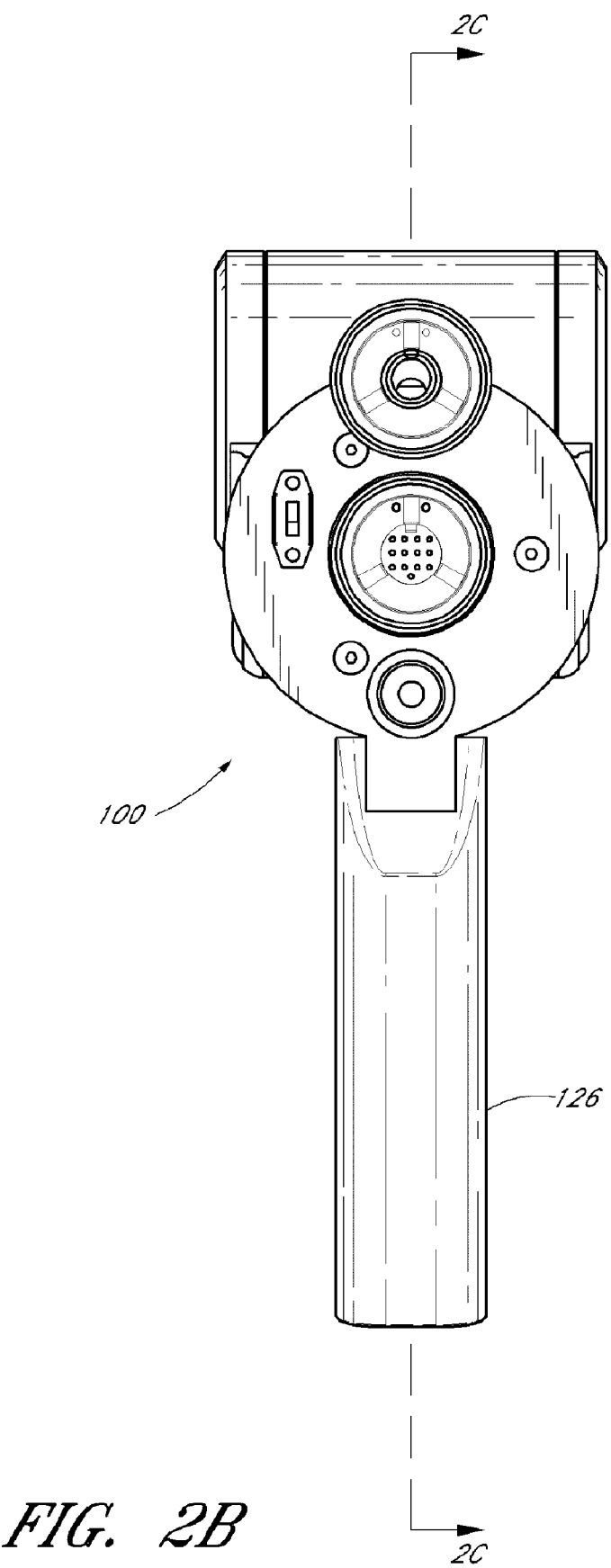
FIG. 2B is a front view of an embodiment of the end joint assembly of FIG. 2A a coordinate measuring machine.
Figure 2C:
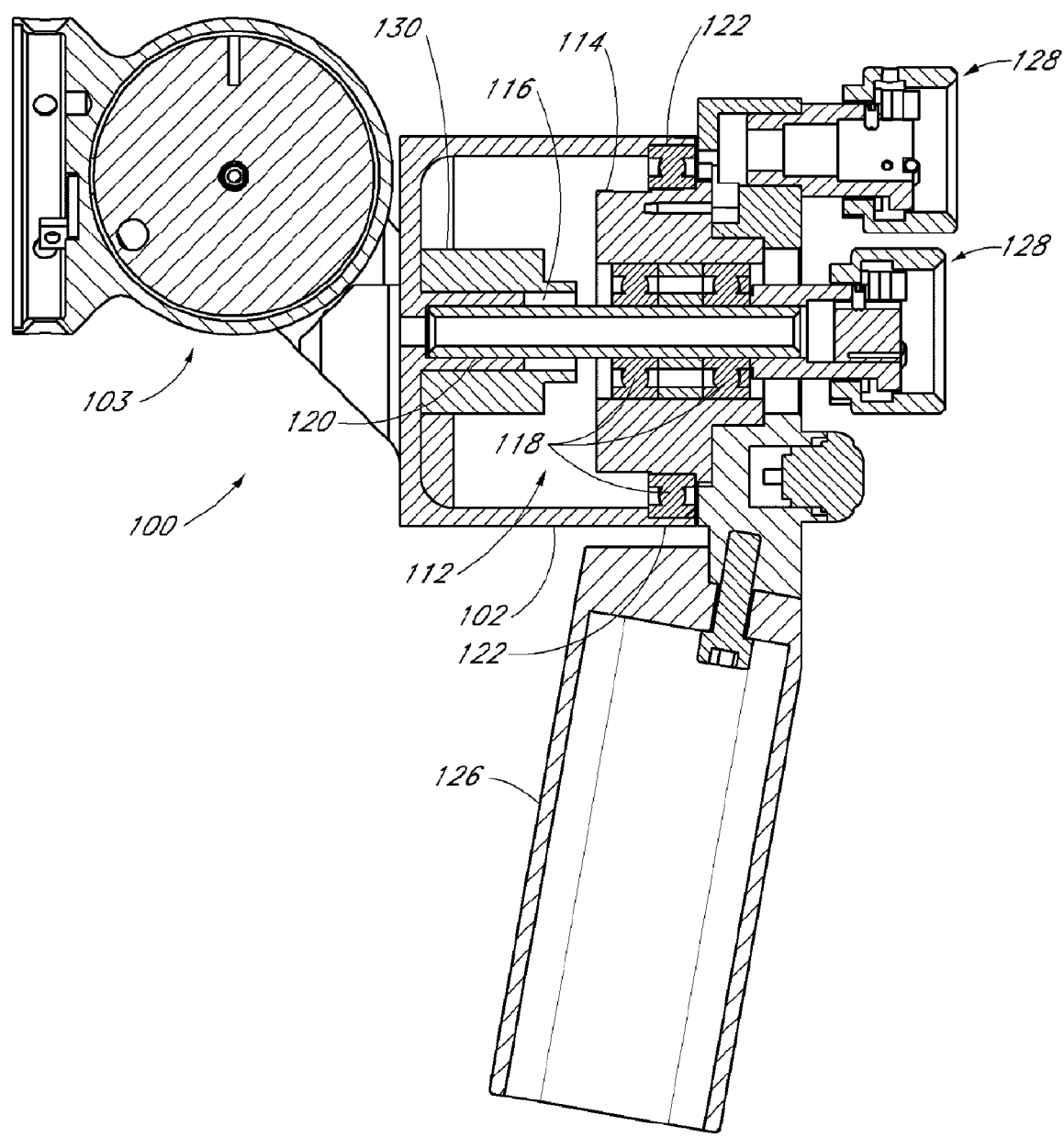
FIG. 2C is a cross-sectional view taken through line 2C-2C of FIG. 2B with a probe of the assembly removed.

FIGS. 2A-C are perspective, front and cross-sectional views of an improved embodiment of a final joint assembly 100 of a portable CMM (such as the embodiment described above). In some embodiments, the joint assembly 100 can be part of a 2-2-3 portable CMM, where each numeral represents the number of axes of movement at a specified joint. Thus, a 2-2-3 portable CMM is a 7 axis CMM allowing 2 axes of rotation at a first joint, two axes of rotation at a second joint, and 3 axes of rotation at a final joint. It will be appreciated, however, that there is no strict limitation to the number of axes of movement that may be used, and fewer or additional axes of movement may be incorporated into the portable CMM.

As will be described below, in this embodiment, the assembly 100 includes a body 102 that is pivotably connected to the rest of the CMM 10 through joint 103 that rotates about a first axis of rotation 104. As indicated in the Figures, this first axis 104 can be the $6^{th}$ axis of a CMM. In other embodiments, additional or fewer axes can be provided. In addition, in the illustrated embodiment, the first axis of rotation 104 comprises a pivot axis.

With reference to FIG. 2A, the assembly 100 also includes a first probe 106, which can be, for example, a rigid probe, an electrical contact probe, a touch trigger probe, a strain sensing probe, a laser point probe, a laser line probe, an optical probe or other probe. The first probe 106 can be rigidly coupled to the body 102 and joint 103. As will be described below, a rotatable assembly 107 is journalled for rotation about a second axis 110 with respect to the body 102 and the probe 106.

With reference to FIGS. 2A-2C, in the illustrated embodiment, the assembly can also include a second probe 108, which can be, for example, a rigid probe, an electrical contact probe, a touch trigger probe, a strain sensing probe, a laser point probe, a laser line probe, an optical probe or other probe. As illustrated in FIG. 2C, the second probe comprises a laser scanner or other measurement device coupled to the assembly 107 such that the laser scanner can rotate about the second axis 110.

Thus, in the illustrated embodiment, the first probe 106 is fixed with respect to the last axis of rotation of the device while the second probe 108 moves with the last axis of rotation. In the illustrated arrangement, the first probe 106 is a hard probe and the second probe 108 is a laser scanner. However, as mentioned above, the specific type of probe can be modified.

The second axis 110 can be the $7^{th}$ axis of rotation of the CMM and can be configured for swiveling rotation about the first probe 106. Thus, in the illustrated embodiment, the rotation about the second axis 110 of the second probe 108 is independent of the first probe 106. This arrangement advantageously allows measurement with the first probe 106 to be more accurate because it does not involve the additional second axis transducer (which will be described below). The second probe 108 is however advantageously provided with the additional axis of movement.

With continued reference to FIGS. 2A-C, the rotatable assembly 107 can comprise an encoder 112. The encoder 112 can generally comprise an encoder disk and an encoder read head. In the illustrated embodiment, the encoder 112 can comprise an encoder housing 114 and an encoder shaft 116. In the illustrated embodiment, the encoder 112 includes one or more bearings 118 for supporting the shaft 116 with respect to the housing 114. In some embodiments, the encoder read head can be positioned on the encoder shaft 116, and the encoder disk can be positioned on the encoder housing 114 such that the encoder can measure rotation of the encoder disk relative to the encoder read head. In other embodiments, the encoder read head can be positioned on the encoder housing 114, and the encoder disk can be positioned on the encoder shaft 114. In still other embodiments, the encoder 112 does not have a specific shaft and housing upon which the encoder read head and encoder disk are positioned. Instead the read head and disk are positioned on components of the assembly 100 that rotate with respect to each other. For example, the read head or the disk can be positioned on the rotatable assembly 107 while the corresponding disk or read head can be positioned on the non-rotatable body 102 or an component attached thereto. In these embodiments, the second axis 110 can be defined as the axis of rotation between the encoder read head and the encoder disk. As described above, the encoder 112 can be one of a variety of types of encoders configured to measure rotational movement of the shaft with respect to the encoder housing.

With reference to FIG. 2C, one end 120 of the encoder shaft 118 is non-rotatably coupled to the body 102. The encoder 112 housing is, in turn, journalled for rotation with respect to the body 102 by one or more bearings 122. In this manner, the encoder housing 114 can rotate with respect to the body 102 while the encoder shaft 116 remains fixed with respect to the body 102 and the first axis of rotation 104. As shown in FIG. 2C, the second probe 108 and a handle 126 can be coupled to the encoder housing 114 such that these components 108, 126 also rotate with respect to the body 102 of the assembly 100. As shown in FIGS. 2A and 2C, the probe 106 can be coupled to a second end of the encoder shaft 116 and thus is non-rotably coupled to the second axis of rotation 104. In the illustrated embodiment, the second end of the encoder shaft 116 extends through the encoder housing 114. A probe connector 128 can be provided between each of the first probe 106 and the shaft 116 and the second probe 108 and the housing 114. The probe connector 128 can include various electrical connectors for identifying the probe 106, 108 and/or receiving data from the first probe 106, which can be transferred via wires (not shown) through the encoder shaft 116, or, as noted below, via a slip ring 130, from the second probe 108.

As shown in FIG. 2C, the assembly 100 can include a slip ring 130, which can be used to transmit data from the laser scanner 108 or other device on the second axis 110. In this manner, the wiring (not shown) associated with the scanner 108 or other device on the assembly 107 can be passed internally through the joints of the CMM 10 and/or the assembly 107 can be rotated infinitely (see e.g., the '148 patent incorporated by reference herein). In other embodiments, the assembly 100 can be configured without the slip ring and/or the wires can be passed externally of the CMM 10. In such embodiments, it may be advantageous to provide a stop or other type of motion limit in the assembly 100.

While the illustrated embodiments of assembly 100 include two probes 106, 108, in some embodiments, it can be desirable to have more than two probes, such as three, four, or more probes. In some of these embodiments, a first probe 106 can be rotationally fixed with respect to the second axis 110, while two or more additional probes are rotatable with respect to the second axis. In others of these embodiments, more than one probe can be rotationally fixed with respect to the second axis 110, while a single probe is rotatable with respect to the second axis 110. In other embodiments, a more than one probe can be rotatably fixed and more than one probe can be rotatable with respect to the second axis 110.

In some embodiments, the CMM 10 and final joint assembly 100 can be pre-assembled such that they are commercially available as a single unit. In other embodiments, the CMM 10 and final joint assembly 100 can be individually commercially available. The CMM 10 can also be configured such that the final axis of movement (i.e., the rotatable assembly 107) can be removed and/or added to an existing device. The CMM 10 and the rotatable assembly 107 can be easily removably couplable with a repeatable kinematic mount. Thus, in some embodiments, the CMM can be a 6 axis (2-2-2) CMM with a kinematic mount allowing a rotatable joint assembly 107 to be mounted. The addition of the final joint assembly to the 6 axis CMM would create a 7 axis (2-2-3) CMM.

The various devices, methods, procedures, and techniques described above provide a number of ways to carry out the invention. Of course, it is to be understood that not necessarily all objectives or advantages described may be achieved in accordance with any particular embodiment described herein. Also, although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, the invention is not intended to be limited by the specific disclosures of preferred embodiments herein.

What is claimed is:

1. A coordinate measurement device comprising:
    an articulated arm having a first end, a second end, and a plurality of jointed arm segments therebetween, each arm segment including at least one position transducer; and
    a measurement probe assembly coupled to the second end of the arm, the measurement probe assembly comprising:
        a first joint providing a first axis of rotation between the second end of the arm and a body of the measurement probe assembly;
        a read head and an encoder disk, the encoder disk configured to rotate about a second axis with respect to the read head;
        a first probe rotatably fixed with respect to the body about the second axis of rotation; and
        a second probe coupled to the body such that the second probe rotates about the second axis with respect to the first probe.

2. The coordinate measurement device of claim 1 wherein said arm includes 7 axes of rotation and the first and second axes comprise the $6^{th}$ and $7^{th}$ axis of rotation respectively.

3. The coordinate measurement device of claim 2, wherein the jointed arm segments are arranged in a 2-2-3 joint configuration.

4. The coordinate measurement device of claim 1, wherein the measurement second probe is a laser scanner.

5. The coordinate measurement device of claim 1, wherein the first probe is a touch probe.

6. The coordinate measurement device of claim 1, wherein the first probe is a rigid probe.

7. The coordinate measurement device of claim 1, further comprising a slip ring provided between the read head and the second probe.

8. The coordinate measurement device of claim 1, further comprising a handle coupled to the body.

9. The coordinate measurement device of claim 1, wherein the measurement probe assembly is removably coupled to the articulated arm.

10. A coordinate measurement apparatus comprising:
- an articulated arm having a first end, a second end, and plurality of jointed arm segments therebetween, each arm segment including at least one position transducer; and
- a measurement assembly coupled to the second end of the arm, the measurement assembly comprising:
  - a first joint providing a first axis of rotation between the second end of the arm and a body of the measurement assembly;
  - a probe rigidly coupled to the first joint; and
  - a measurement device configured for rotation about the probe.

11. A portable coordinate measurement machine (CMM) for measuring the position of an object in a selected volume, comprising:
- a manually positionable articulated arm having opposed first and second ends, said arm including a plurality of rotary joints; and
- a measurement assembly coupled to the second end of the arm, the measurement assembly comprising a first rotable joint providing a first axis of rotation, a probe rigidly coupled to the first joint, a measurement device configured for rotation about the probe and means for rotating the measurement device about the probe along a second axis of rotation.

12. The CMM of claim 11 wherein said arm includes 7 axes of rotation and the first and second axes comprise the $6^{th}$ and $7^{th}$ axis of rotation respectively.

13. The CMM of claim 12, wherein the arm is arranged in a 2-2-3 joint configuration.

14. The CMM of claim 11, wherein the measurement device is a laser scanner.

15. The CMM of claim 11, wherein the probe is a touch probe.

16. The CMM of claim 11, wherein the probe is a rigid probe.

17. The CMM of claim 11, further comprising a handle coupled to the measurement device.

18. The CMM of claim 11, further comprising a slip ring.

19. A joint for a coordinate measurement apparatus comprising:
- a joint body connectable to a coordinate measurement apparatus;
- a rotatable joint defining an axis of rotation of the joint;
- a first probe connector rotationally fixed with respect to the joint body about the axis of rotation of the joint; and
- a second probe connector rotatable with respect to the joint body about the axis of rotation of the joint.

20. The joint of claim 19, further comprising a first probe coupled to the first probe connector.

21. The joint of claim 20, wherein the first probe comprises one of a rigid probe, an electrical contact probe, a touch trigger probe, a strain sensing probe, a laser point probe, a laser line probe, and an optical probe.

22. The joint of claim 19, further comprising a second probe coupled to the second probe connector.

23. The joint of claim 22, wherein the second probe comprises one of a rigid probe, an electrical contact probe, a touch trigger probe, a strain sensing probe, a laser point probe, a laser line probe, and an optical probe.

24. The joint of claim 19, wherein the joint is configured to be removably couplable to the coordinate measurement apparatus.

* * * * *

UNITED STATES PATENT AND TRADEMARK OFFICE
CERTIFICATE OF CORRECTION

PATENT NO. : 7,624,510 B2  Page 1 of 1
APPLICATION NO. : 11/963531
DATED : December 1, 2009
INVENTOR(S) : Paul Ferrari It is certified that error appears in the above-identified patent and that said Letters Patent is hereby corrected as shown below:

Title Page item 56 in List of References cited applicant and considered by examiner in the Foreign Patent Documents, add the following:

| | | |
|---|---|---|
| JP | 404057690 | 2/1992 |
| JP | 2003/175484 | 6/2003 |
| JP | 2003275484 | 9/2003 |
| JP | 04-032393 | 2/1992 |
| JP | 05-031685 | 02/1993 |
| JP | 2006-214559 | 8/2006 |
| JP | 2003-021133 | 1/2003 |
| WO | 98/08050 | 2/1998 |

In Column 2, Line 13, change "rotable" to --rotatable--, therefor.

In Column 3, Line 45, change "a the" to --the--, therefor.

In Column 5, Line 28 (Approx.), change "or an" to --or a--, therefor.

In Column 5, Lines 46-47, change "non-rotably" to --non-rotatably--, therefor.

In Column 7, Line 36, in Claim 11, change "rotable" to --rotatable--, therefor.

Signed and Sealed this

Twenty-second Day of June, 2010

David J. Kappos
*Director of the United States Patent and Trademark Office*